June 10, 1930.                J. I. WEISSMAN ET AL                1,762,750
                                TIRE CHAIN CONNECTION
                                Filed June 20, 1927
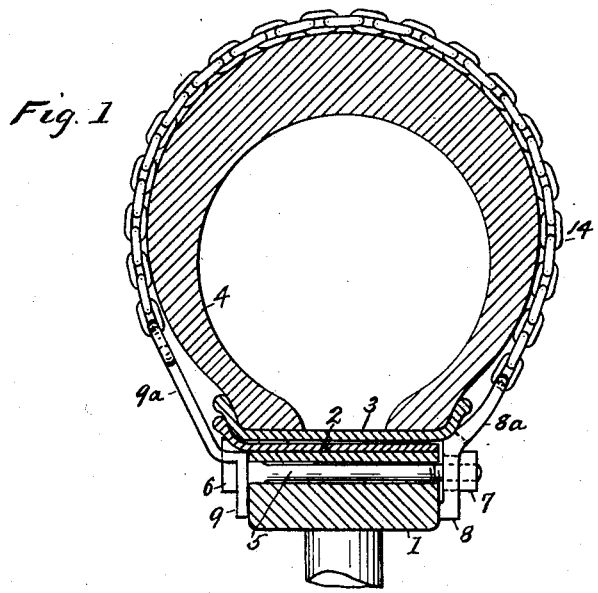
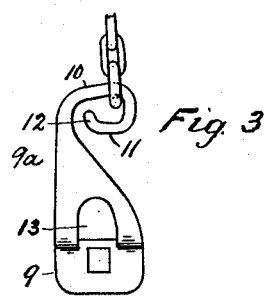
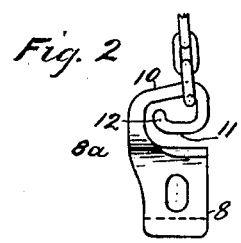
INVENTORS
Joseph I. Weissman
BY Morris Goldstein
Wm Dodge ATTORNEY Patented June 10, 1930

1,762,750

UNITED STATES PATENT OFFICE

JOSEPH I. WEISSMAN, OF BROOKLYN, AND MORRIS GOLDSTEIN, OF OZONE PARK, NEW YORK; SAID GOLDSTEIN ASSIGNOR TO JOSEPH GOLDSTEIN, OF BROOKLYN, NEW YORK

TIRE-CHAIN CONNECTION

Application filed June 20, 1927. Serial No. 200,089.

The invention relates to improvements in time chain connections for motor vehicles, in which the traction chains are passed transversely across the tread of the tire and securely held in position at their opposite ends.

The objects of the present invention include connection means consisting of few parts by which the links of an ordinary standard chain may be readily connected in detachable relation upon the tire. A further object is to provide the connections with means whereby the chain-ends are held in close relation therewith and thus avoid the use of snap hooks commonly employed.

For further comprehension of the invention, and of the objects and advantages thereof, reference is had to the following description and accompanying drawing, and to the appended claims in which the various features of the invention are more particularly pointed out.

In the drawing, Figure 1 is a transverse section of a felly and a tire of a wheel, showing in position thereon the cross chain and connections therefor.

Figures 2 and 3 are side views of the chain connections looking respectively towards the tire.

In the drawing numeral 1 shows a conventional wheel felly having secured thereon the outer binding ring 2, and upon the latter is carried the demountable tire rim 3 arranged to support the pneumatic tire 4, the parts thus indicated being of well-known construction.

Extending transversely through the felly 1 is a clamp screw 5, having at one end an elongated head 6, the opposite end of the screw being threaded to engage the nut 7. The clamp screw 5 represents one of a number spaced around the felly of the wheel which engage the clamp lugs 8 and 9 and serve in the usual manner to laterally support the demountable rim 3.

Integrally formed with the clamp lugs 8 and 9 and extending outwardly therefrom are similar hook members 8ª and 9ª having overlapping outer and inner sections spaced apart from each other and respectively indicated by 10 and 11, the outer of said sections being outwardly inclined, and the inner of said sections having a free end outwardly bent to form a stop 12 to prevent the accidental displacement of the connected chain links 14. In the connection with the latter the terminal links are passed over the stop 12 and drawn outwardly to engage the outwardly inclined sections 10 as shown in Figs. 2 and 3, where the stress of the chain normally tends to hold the terminal link in close engagement with the extreme outwardly extending portion of said inclined sections, the said hook sections being disposed in a plane having a general direction substantially common with that of the foot of said clamp lugs. In case of chain vibration due to the rotation of the wheel, any tendency toward accidental disengagement from the hook members will be overcome by the stop members 12.

The hook member 9ª is further provided with a perforation 13 disposed to receive the elongated head portion 6 of the clamp screw 5 and prevent the rotation of the latter during the turning or clamping movement of the nut 7.

With the clamp lugs thus provided with hook members the chain sections 14 may be readily connected thereto without the use of snap hooks and securely held against accidental displacement.

What we claim as our invention and desire to secure by Letters Patent, is:

1. In antiskid chain connections for a wheel tire, a clamp lug arranged for connection to the felly of the wheel, and a hook member integral with said lug and projecting therefrom and forming a circumferentially extending looped connection disposed to admit a link of the chain and permit a movement thereof lengthwise of said loop.

2. In antiskid chain connections for a wheel tire, a clamp lug arranged for connection to the felly of the wheel, an outwardly extending hook member integral with said clamp lug, the said hook member having overlapping outer and inner sections spaced apart from each other and forming a circumferentially extending looped connection disposed to admit a link of the chain and permit a movement thereof lengthwise of said loop.

3. In antiskid chain connections for a wheel tire, a clamp lug arranged for connection to the felly of the wheel, an outwardly extending hook member integral with said clamp lug, the said hook member having overlapping outer and inner sections spaced apart from each other and forming a circumferentially extending looped connection, the said inner section thereof having its free end outwardly bent to form a stop disposed to admit a link of the chain into said loop and permit a movement thereof lengthwise of said loop.

Signed at No. 1 Broadway, New York city, in the county of New York and State of New York, this 10th day of June, A. D. 1927.

JOSEPH I. WEISSMAN.
MORRIS GOLDSTEIN.